United States Patent
Yamaki

(10) Patent No.: US 8,155,341 B2
(45) Date of Patent: Apr. 10, 2012

(54) VEHICULAR AUDIO APPARATUS, AND TONE GENERATING METHOD AND PROGRAM THEREFOR

(75) Inventor: Kiyoshi Yamaki, Iwata-gun (JP)

(73) Assignee: Yamaha Corporation, Hamamatsu-shi (JP)

( * ) Notice: Subject to any disclaimer, the term of this patent is extended or adjusted under 35 U.S.C. 154(b) by 1187 days.

(21) Appl. No.: 10/942,365

(22) Filed: Sep. 15, 2004

(65) Prior Publication Data
US 2005/0058305 A1   Mar. 17, 2005

(30) Foreign Application Priority Data

Sep. 16, 2003 (JP) ................................. 2003-323626
Jul. 28, 2004 (JP) ................................. 2004-220236

(51) Int. Cl.
*H04B 1/00* (2006.01)

(52) U.S. Cl. ........................................... 381/86; 381/61

(58) Field of Classification Search .................... 381/86, 381/101, 302, 61; 701/211, 23, 29, 36, 45, 701/49; 340/988, 992, 425.5–480
See application file for complete search history.

(56) References Cited

U.S. PATENT DOCUMENTS

| | | | |
|---|---|---|---|
| 4,015,237 A * | 3/1977 | Takatani et al. ................ 340/459 |
| 4,785,280 A * | 11/1988 | Fubini et al. ................... 340/438 |
| 5,237,617 A * | 8/1993 | Miller .............................. 381/61 |
| 5,371,802 A * | 12/1994 | McDonald et al. ........... 381/71.4 |
| 5,394,332 A * | 2/1995 | Kuwahara et al. ............. 701/211 |
| 5,406,492 A * | 4/1995 | Suzuki ............................. 381/86 |
| 5,635,903 A * | 6/1997 | Koike et al. .................... 340/441 |
| 6,172,641 B1 * | 1/2001 | Millington ................ 342/357.13 |
| 6,198,996 B1 * | 3/2001 | Berstis ............................. 701/36 |
| 6,363,322 B1 * | 3/2002 | Millington ..................... 701/211 |
| 6,937,732 B2 * | 8/2005 | Ohmura et al. .................. 381/86 |
| 6,982,635 B2 * | 1/2006 | Obradovich ................... 340/439 |
| 7,203,321 B1 * | 4/2007 | Freymann et al. .............. 381/61 |
| 2004/0024478 A1 * | 2/2004 | Hans et al. ....................... 700/94 |

FOREIGN PATENT DOCUMENTS

JP          11-208370          8/1999

* cited by examiner

*Primary Examiner* — Vivian Chin
*Assistant Examiner* — Fatimat O Olaniran
(74) *Attorney, Agent, or Firm* — Morrison & Foerster LLP

(57) ABSTRACT

In accordance with a traveling state of a vehicle, a tone indicating, for example, that the vehicle is traveling is generated as a tone of a first performance part. Also, a variation in any of various states of the vehicle, such as an operating condition of a winker or flasher, is detected, and a tone corresponding to the detected state is generated as a tone of a second performance part. For example, ensemble data including the first and second performance parts may be employed.

15 Claims, 8 Drawing Sheets

TBL1

| PART DATA NAME | OUTPUT CONDITION | MODULATION FLAG fg |
|---|---|---|
| WINKER PART DATA | ACTIVATION OF WINKER | 1 |
| TRAVEL PART DATA | TRAVELING | 1 |

F I G. 4

TBL2

| TRAVELING SPEED v | MODULATION FLAG |
|---|---|
| $0 \leqq v < V1$ | 0 |
| $V1 \leqq v < V2$ | 1 |
| $V2 \leqq v < V3$ | 2 |
| $V3 \leqq v$ | 3 |

F I G. 5

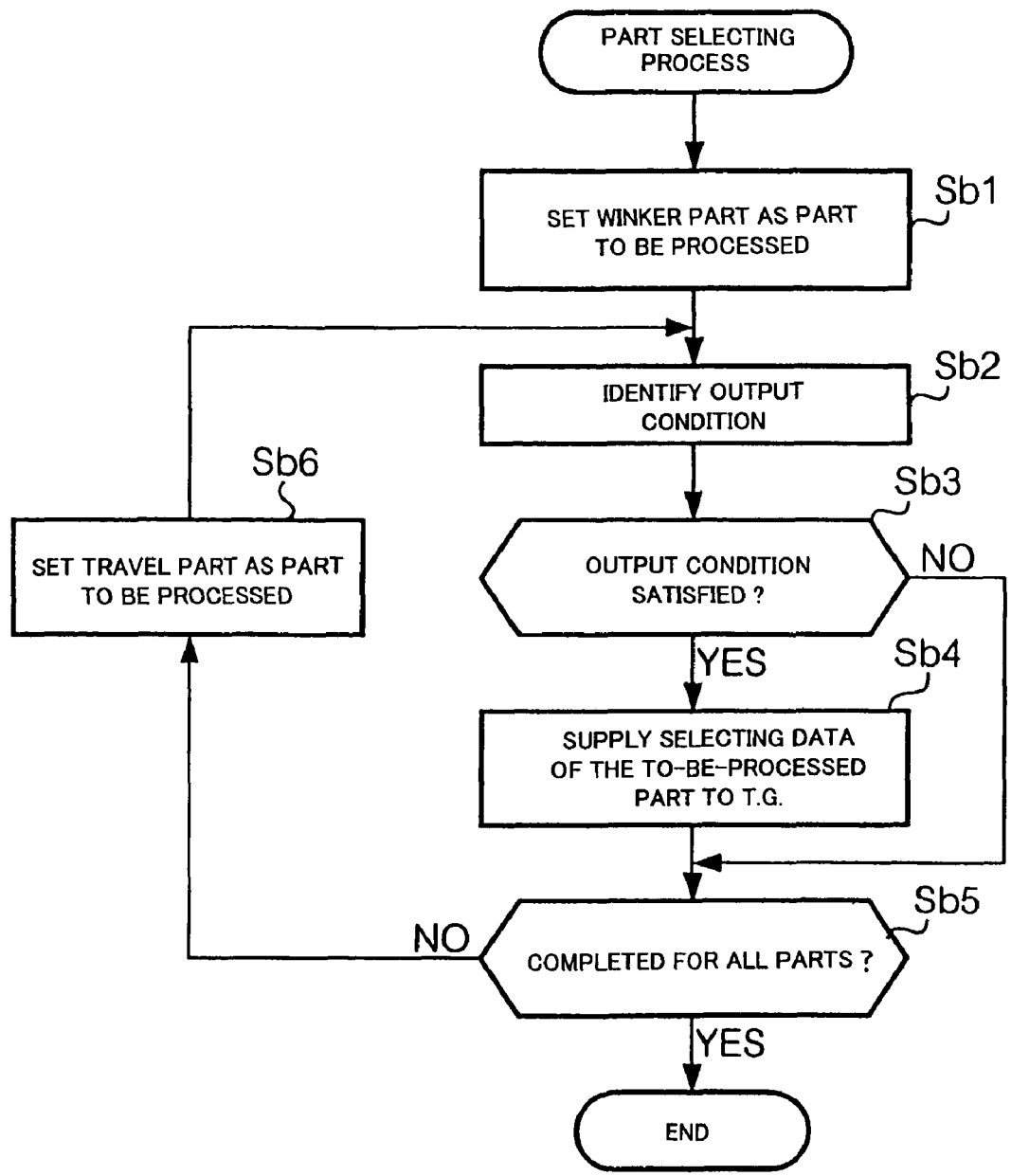
F I G. 8

VEHICULAR AUDIO APPARATUS, AND TONE GENERATING METHOD AND PROGRAM THEREFOR

BACKGROUND OF THE INVENTION

The present invention relates to vehicular audio apparatus for installation on vehicles, such as automotive vehicles, and tone generating methods and programs therefor.

Today, as vehicular audio apparatus for installation on automotive vehicles, apparatus are in practical use which are constructed to produce or audibly output sounds or tones periodically while a direction indicator (also referred to as "winker" or "flasher") is in operation. There have also been proposed, for example in Japanese Patent Application No. HEI-7-32948, vehicular audio apparatus which detect a degree of opening of a throttle valve responsive to operation of an accelerator pedal and a traveling speed of the vehicle and audibly output sounds or tones in accordance with the detected results. With these conventionally-known vehicular audio apparatus, a human vehicle operator or driver can perceive or recognize, from the audibly-output tones, his or her driving operation and states of the vehicle, such as operation of the direction indicator or winker (flasher), degree of opening of the accelerator and traveling speed of the vehicle, without having to view a gauze board or instrument panel.

However, the tones produced by the above-discussed audio apparatus for allowing the human vehicle driver to recognize his or her driving operation and states of the vehicle tend to be very monotonous, because they are generally fixed tones output periodically in a fixed manner. In addition, these tones are output independently between various types of driving operation and states of the vehicle, which would unavoidably result in very poor harmony between the tones audibly output for the various types of operation and states. As a consequence, in the case where a plurality of tones, representative of driving operation and states of the vehicle, are audibly output at a given time, a combination of these tones tends to sound considerably "mechanical" and give the human vehicle driver and other passenger an uncomfortable feeling.

SUMMARY OF THE INVENTION

In view of the foregoing, it is an object of the present invention to provide an improved vehicular audio apparatus which can reliably prevent an uncomfortable feeling from being given by tones audibly output within a vehicle, such as an automotive vehicle, and a tone generating method and program for the audio apparatus.

According to an aspect of the present invention, there is provided a vehicular audio apparatus, which comprises: a detection device that detects a variation in a state of a vehicle; and a tone generation device that generates a tone of a first performance part and that also generates a tone of a second performance part in accordance with the variation in the state of the vehicle, detected by the detection device, in parallel with the first performance part and in such a manner that the tone of the second performance part is synchronized with the first performance part.

When a variation in a given state of the vehicle has been detected during generation of a tone of the first performance part, the vehicular audio apparatus of the present invention generates a tone of the second performance part, in response to the detection, in such a manner that the tone of the second performance part is synchronized with the first performance part. Thus, the present invention allows tones of a plurality of performance parts to be generated in a synchronized or appropriately harmonized manner, thereby preventing an uncomfortable feeling from being imparted to persons (passengers) within the vehicle. Namely, when a plurality of types of tones are to be generated in the vehicle in accordance with a traveling state, driving/operating state, etc. of the vehicle, the present invention can effectively prevent the generated tones from causing a bothersome noise feeling and thus never impart an uncomfortable feeling to the passengers, by synchronizing (harmonizing) the tones generated within the compartment of the vehicle.

The present invention also provides a vehicular audio apparatus, which comprises: a detection device that detects a variation in a state of a vehicle; a storage device that stores music piece data including at least first part data representative of a first performance part and second part data representative of a second performance part; a tone generation device that generates a tone of the first performance part on the basis of the first part data stored in the storage device and that, in accordance with the variation in the state of the vehicle detected by the detection device, generates a tone of the second performance part on the basis of the second part data in parallel with the first performance part and in such a manner that the tone of the second performance part is synchronized with the first performance part; and a control device that varies a characteristic of the tone of the first performance part or the second performance part, to be generated by the tone generation device, in accordance with the variation in the state of the vehicle detected by the detection device.

The present invention also provides a vehicular audio apparatus, which comprises: a detection device that detects a traveling speed of a vehicle; a first storage device that stores music piece data including a series of event data instructing controlling of tone generation; a second storage device that stores a table defining correspondency between possible traveling speeds of the vehicle and modulation parameters; and a tone generation device that generates a tone based on the music piece data stored in the first storage device, with reference to the table stored in the second storage device, with a musical key designated by the modulation parameter corresponding to the traveling speed of the vehicle detected by the detection device.

Here, the "state of the vehicle" may be any state that varies time-serially in the vehicle and can be detected by a sensor. More specifically, the "variation in the state of the vehicle" refers not only to a variation in an operating condition of equipment employed in the vehicle, but also to a variation in operation or instruction, related to driving of the vehicle, input via an operator member. For example, where the vehicle is an automotive vehicle, any of a variation in the traveling speed of the vehicle, variation in the number of rotations of the engine and motor, operation of the ignition switch, accelerator pedal, brake pedal, winker (operating) lever, shift lever and lamp switch, etc. may be employed as the "variation in the state of vehicle".

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 4 is a diagram illustrating example contents of a part table stored in a storage section of the car audio system;

FIG. 5 is a diagram illustrating example contents of a modulation parameter table stored in the storage section of the car audio system;

FIG. 8 is a flow chart of a part selecting process performed in the car audio system;

DETAILED DESCRIPTION OF THE EMBODIMENTS

Detailed description will hereinafter be given about a car audio system in accordance with an embodiment of the present invention, with reference to accompanying drawings. This car audio system is a system for providing a music piece (ensemble), having a plurality of performance parts, to a passenger (or passengers) within a passenger-carrying automotive vehicle, such as a two-wheel or four-wheel automotive vehicle. The following description will be made under the assumption that the automotive vehicle having the car audio system mounted or installed thereon is an electric vehicle.

Figure 1:
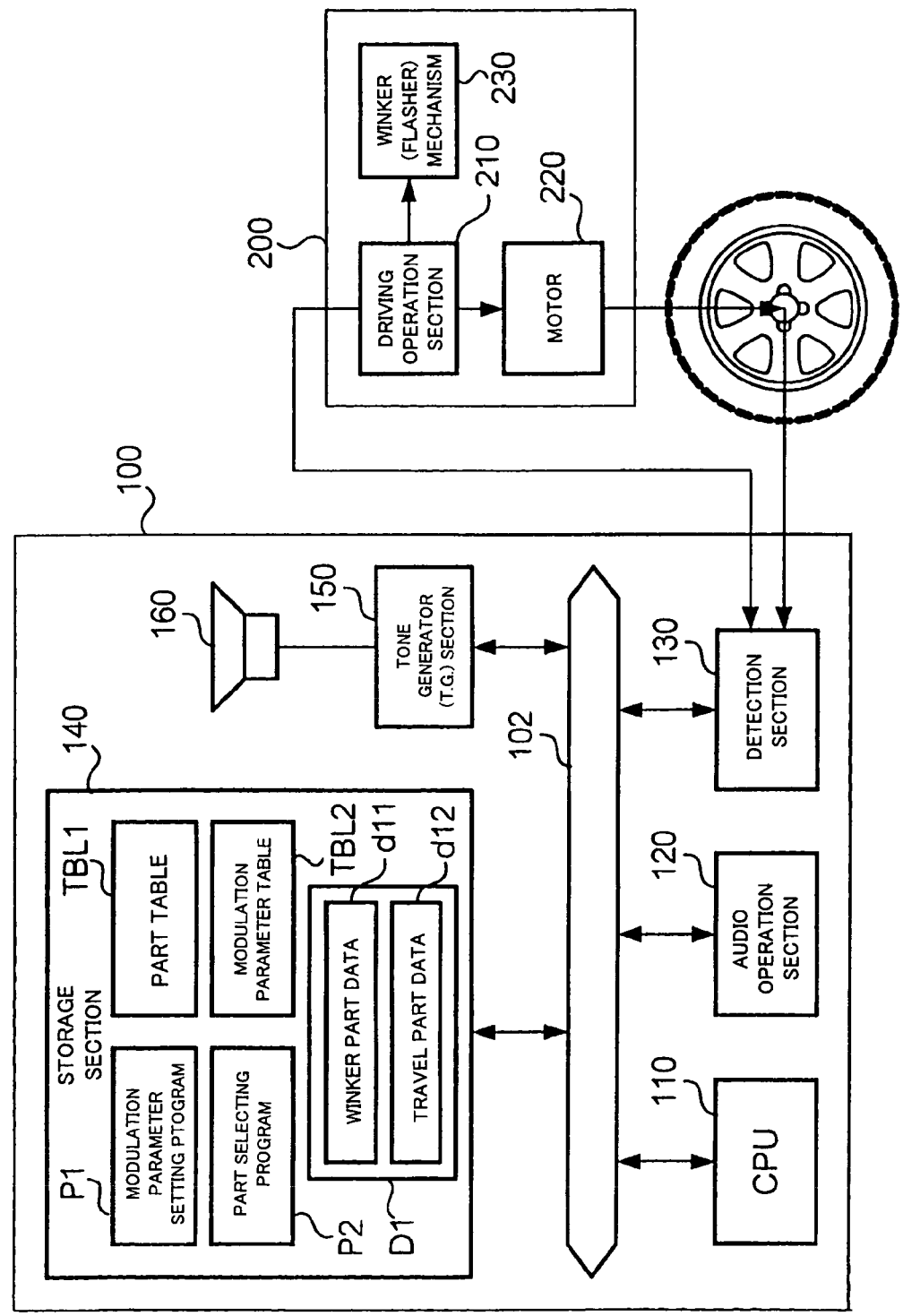
FIG. 1 is a block diagram illustrating an example general setup of a car audio system in accordance with an embodiment of the present invention.

FIG. 1 is a block diagram illustrating the car audio system 100 of the present invention and the automotive vehicle 200 having the car audio system installed thereon.

First, a general setup of the vehicle 200 where the car audio system 100 is installed is explained. In FIG. 1, a driving operation section 210 includes driving operator members for inputting driving-related instructions, and it delivers each of the instructions, input via the driving operator members, to various components of the vehicle 200 including a motor 220 and direction indicator (winker or flasher) mechanism 230. Examples of the driving operator members include a steering wheel, shift lever, accelerator pedal, brake pedal, winker lever, etc.

The motor 220, which is a device for driving the automotive vehicle 200, supplies road wheels with a rotational force corresponding to driving-related instructions input via the accelerator pedal and shift lever. The direction indicator or winker (flasher) mechanism 230 includes a winker or flasher that is turned on or off (i.e., activated or deactivated) in response to an instruction input via the winker lever. Although not specifically shown, the automotive vehicle 200 also includes other mechanisms, such as a brake mechanism for braking the rotation of the road wheels in accordance with driver's depression of the brake pedal, as in the conventional electric vehicles; however, such other mechanisms will not be described in detail here because their constructions and behavior are well known.

<Setup of the Car Audio System>

Setup of the car audio system 100 is described with continued reference to FIG. 1. The car audio system 100 includes a CPU (Central Processing Unit) 110 that controls the entire car audio system 100 in accordance with control programs, such as a modulation (i.e., musical key change) parameter setting program P1 and part selecting program P2. The modulation parameter setting program P1 and part selecting program P2 are programs for outputting an ensemble (music piece), having two performance parts, in accordance with a variation in any of various states of the automotive vehicle 200, as will be later described in detail.

Audio operation section 120, which includes operator members, such as a start instruction switch and modulation instruction switch, supplies the CPU 110 with a signal indicative of an instruction input by a user. The start instruction switch is an operator member provided for the user to instruct a start of audible output of an ensemble music piece, and the modulation instruction switch is an operator member provided for the user to instruct whether or not the ensemble music piece should be modulated in accordance with a traveling speed of the vehicle 200.

Detection section 130 detects, as a state of the vehicle 200, an operating condition of the vehicle 200 and a driving-related instruction input via the driving operation section 210. Specifically, the operating condition of the vehicle 200 is, for example, a traveling speed (velocity) of the vehicle 200, which is detected on the basis of the number of rotations of the road wheels per predetermined unit time. On the other hand, the driving-related instruction is, for example, an instruction given by the human vehicle driver for switching between activation and deactivation of the winker.

Figure 2:
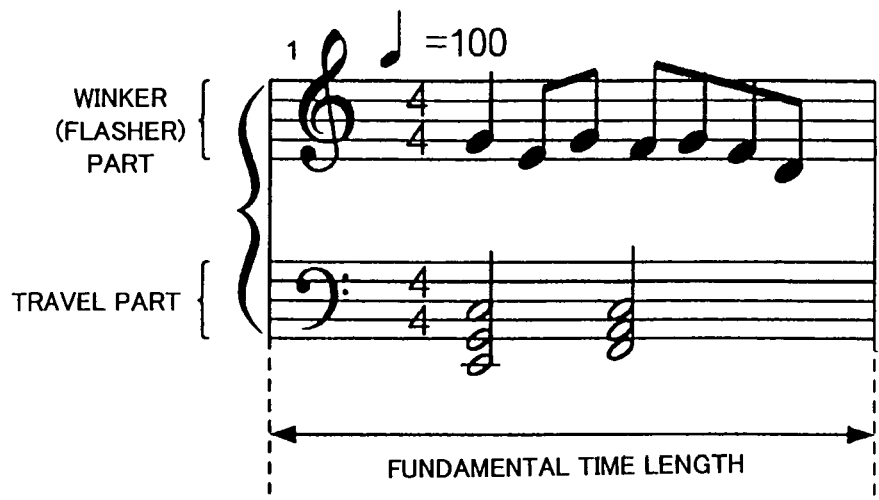
FIG. 2 is a diagram illustrating example contents of a winker part and travel part of music piece data employed in the car audio system of FIG. 1.

Storage section 140 is, for example, in the form of a magnetic disk, which stores the above-mentioned modulation parameter setting program P1 and part selecting program P2, sets of ensemble data D1, part table TBL1 and modulation parameter table TBL2. The modulation parameter setting program P1 and part selecting program P2 are programs executable by the CPU 110 as noted above, execution of which is initiated in response to the ensemble output start instruction given via the start instruction switch. In accordance with these programs, the CPU 110 audibly outputs (tones) of a winker part and travel part of an ensemble, as illustrated in FIG. 2, in response to detection of an operating condition of the winker and traveling state of the vehicle.

More specifically, in accordance with the part selecting program P2, the CPU 110 causes the direction indicator or winker part to be audibly output while the winker is in operation and causes the travel part to be audibly output while the vehicle is traveling. Also, in accordance with the modulation parameter setting program P1, the CPU 110 causes the winker part and travel part to modulate, in response to detection of a traveling speed of the vehicle 200.

The ensemble data sets D1 comprise data compliant with, for example, the MIDI (Musical Instrument Digital Interface) standard, and each of the ensemble data sets D1 is composed of sets of data corresponding to different performance parts; in the instant embodiment, each of the ensemble data sets D1 includes a set of winker part data d11 and a set of travel part data d12. The set of winker part data d11 comprises data indicative of tones of the winker part as illustrated in FIG. 2, while the set of travel part data d12 comprises data indicative of tones of the travel part. Of course, any desired ones of the ensemble data sets D1 may be selected by the user (vehicle driver).

Figure 3:
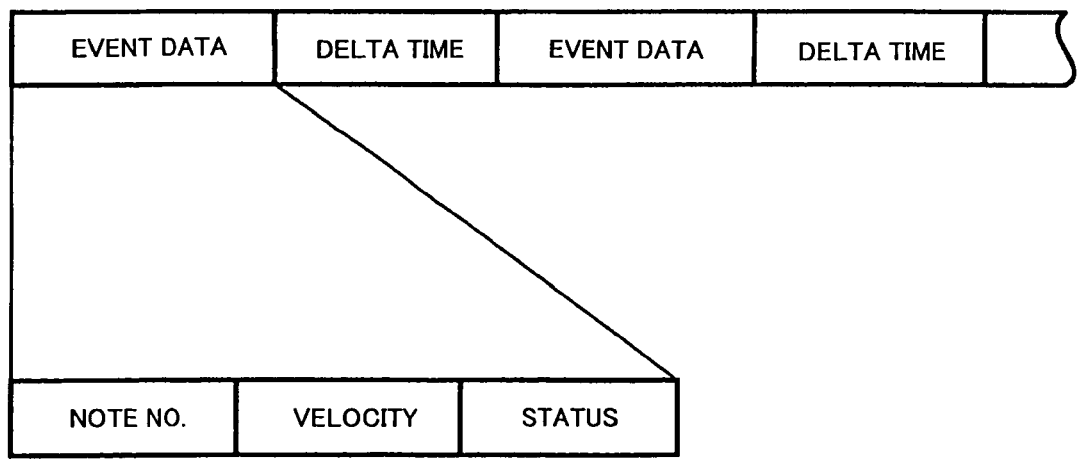
FIG. 3 a diagram illustrating an example organization or format of MIDI data.

As illustrated in FIG. 3, MIDI data based on the MIDI standard, with which the ensemble data D1 are compliant, generally comprise combinations of event data and delta times. Each of the event data includes data of a note number indicative of a tone pitch, a velocity indicative of an intensity of the tone and a status indicative of content of a process, such as beginning or ending of tone generation. Each of the delta times is indicative of a time interval between occurrence timing of an event defined by event data immediately preceding the delta time and an event defined by event data immediately following the delta time.

The set of winker part data d11 includes, for each tone of the winker part illustrated in FIG. 2, event data instructing controlling of generation of the tone, such as beginning and ending of generation of the tone, and a delta time designating occurrence timing of each event indicated by the event data. Similarly, the set of travel part data d12 includes, for each tone of the travel part illustrated in FIG. 2, event data instructing beginning and ending of generation of the tone, and a delta time designating occurrence timing of each event indicated by the event data.

The winker part and travel part together constitute a single ensemble and are set to a same beat. Therefore, it is possible to audibly output the tones of the winker part data d11 and travel part data d12 in a synchronized manner, by concurrently reproducing the winker part data d11 and travel part data d12 in a parallel fashion with respective reproduction start timing of the winker part data d11 and travel part data d12 appropriately synchronized with each other. Namely, the instant embodiment can output an ensemble with the beats of the winker part and travel part conformed to each other.

Note that the winker part data d11 and travel part data d12 will hereinafter be collectively referred to as "part data" where there is no need to specifically distinguish between them.

FIG. 4 is a diagram illustrating example contents of the part table TBL1 stored in the storage section 140. As shown, each record in the part table TBL1 includes a part data name, an output condition, and a modulation flag fg. The part data name indicates the name of the part data in question (i.e., winker part data d11 or travel part data d12).

Further, the output condition indicates a condition on which the part data in question should be output, i.e. a condition for controlling whether or not tone generation should be permitted. More specifically, an output condition "activation of the winker" is set for the winker part data d11; namely, once the winker has been activated, tone generation based on the winker part data d11 is permitted at the activated timing of the winker. Time period over which the tone generation is permitted may either correspond exactly to the ON period of the winker, or be controlled per measure. On the other hand, an output condition "traveling of the vehicle 200" is set for the travel part data d12.

The modulation flag fg indicates whether or not the part data set identified by the corresponding part data name is one that should be caused to modulate in accordance with a traveling speed of the vehicle. More specifically, if the modulation flag fg is at a value "1", it means that the part data set should be caused to modulate in accordance with the traveling speed of the vehicle, while, if the modulation flag fg is at a value "0", it means that the part data set should be audibly output at an original (unchanged) key (pitches) with no modification responsive to the traveling speed of the vehicle.

The modulation flag fg in each of the records is rewritable by user's operation via the modulation instruction switch provided on the audio operation section 120. In this way, the user, such as the human vehicle driver, can instruct modulation (musical key change) for a plurality of parts having tonality with each other, and can instruct that no modulation should be made for a drum part or the like having no tonality with other parts. Whereas the instant embodiment is described in relation to the case where the modulation flag fg is variable by the user, the value of the modulation flag fg may be preset by the supplier (creator) of the ensemble data sets D1.

FIG. 5 is a diagram illustrating example contents of the modulation parameter table TBL2 stored in the storage section 140. As shown, each record in the modulation parameter table TBL2 includes a traveling speed v and a modulation parameter corresponding to the traveling speed v. As the traveling speed v, items of information are stored which are indicative of different traveling speed ranges of the vehicle 200. As the modulation parameter, parameters are stored which are indicative of degrees of modulation for the winker part represented by the winker part data d11 and travel part represented by the travel part data d12.

Specifically, in the modulation parameter table TBL2, a modulation parameter "0" is defined in association with a traveling speed "$0 \leq v < V_1$", a modulation parameter "1" is defined in association with a traveling speed "$V_1 \leq v < V_2$", a modulation parameter "2" in association with a traveling speed "$V_2 \leq V < V_3$", and a modulation parameter "3" in association with a traveling speed "$V_3 \leq v$".

Here, the modulation parameter "0" indicates that the tones of the winker part and travel part should be audibly output at original tone pitches with no modulation. The modulation parameter "1" indicates that the tones of the winker part and travel part should be audibly output at pitches higher by a half step than the pitches for the modulation parameter "0". The modulation parameter "2" indicates that the tones of the winker part and travel part should be audibly output at pitches still higher by a half step than the pitches for the modulation parameter "1". The modulation parameter "3" indicates that the tones of the winker part and travel part should be audibly output at pitches still higher by a half step than the pitches for the modulation parameter "2". Further, the modulation parameter "4" indicates that the tones of the winker part and travel part should be audibly output at pitches still higher by a half step than the pitches for the modulation parameter "3".

Referring back to FIG. 1, the car audio system 100 also includes a tone generator (T.G.) section 150 in the form of a MIDI tone generator, which generates a tone signal on the basis of the ensemble data D1, modulation parameter and part selecting data supplied by the CPU 110 as will be later described in detail. Further, the tone generator section 150, having received the modulation parameter, performs a modulation process on the winker part data d11 and travel part data d12 on the basis of the received modulation parameter. Here, the modulation process is intended to cause tones, represented by the winker part data d11 and travel part data d12, to modulate to a musical key designated by the modulation parameter. Also, the tone generator section 150 selectively supplies the tone signals, represented by the winker part data d11 and travel part data d12 having been subjected to the modulation process, to a speaker 160 in accordance with the part selecting data.

Figure 6:
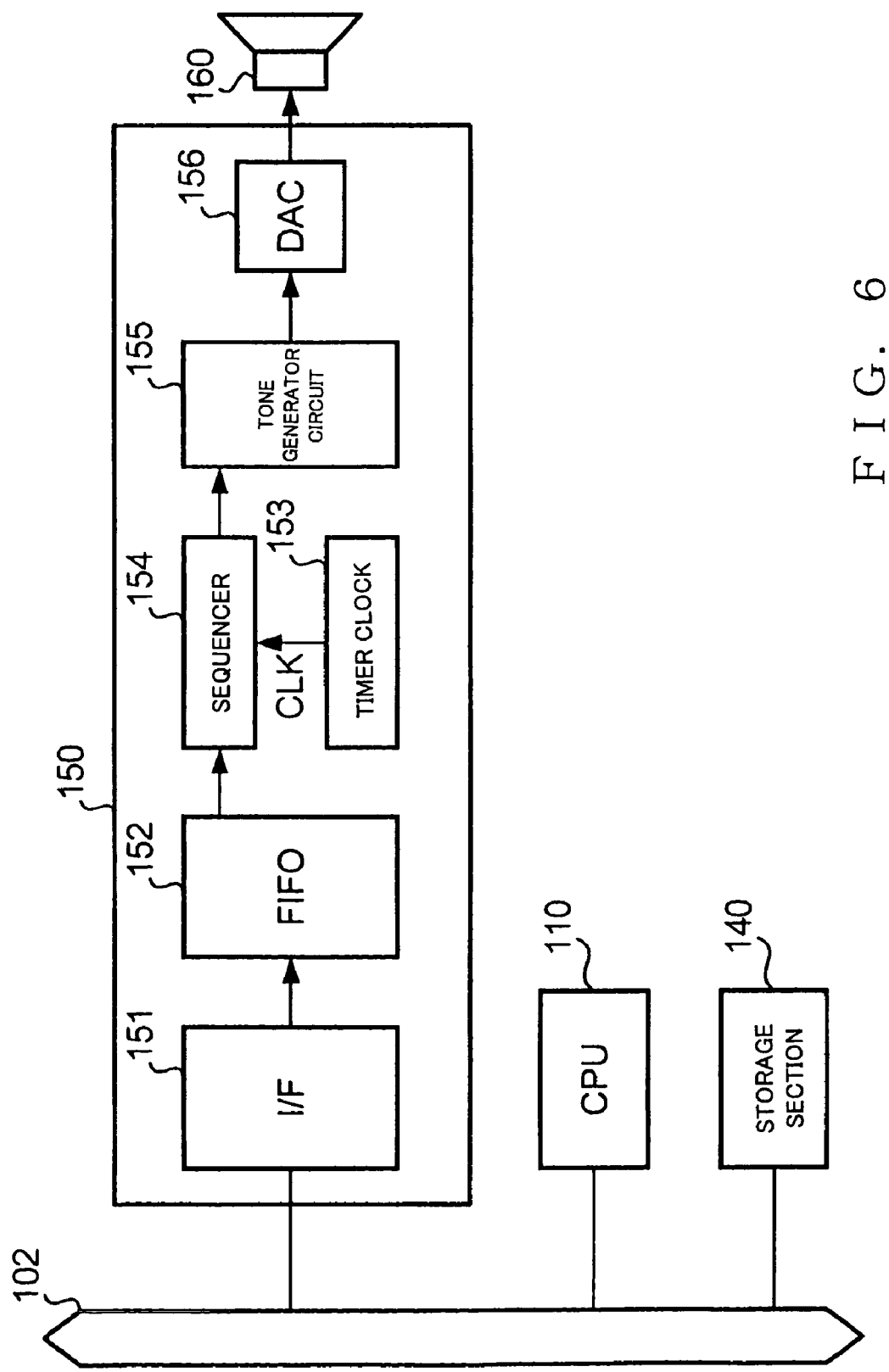
FIG. 6 is a block diagram showing example construction of a tone generator section and components peripheral to the tone generator section in the car audio system.

FIG. 6 is a block diagram showing example construction of the tone generator (T.G.) section 150 and components peripheral to the section 150. As shown, the tone generator section 150 includes an interface (I/F) 151, a FIFO (First-In First-Out) memory 152, a timer clock 153, a sequencer 154, a tone generator circuit 155, and a DAC (Digital-to-Analog Converter) 156.

The interface 151 receives, via a bus 102, the modulation parameter, part selecting data and ensemble data D1 supplied by the CPU 110, and it delivers the received data to the FIFO memory 152. The FIFO memory 152 sequentially stores therein the delivered modulation parameter, part selecting data and ensemble data D1. The data thus stored in the FIFO memory 152 are read out by a sequencer 154 in the order as they were stored.

Figure 9:
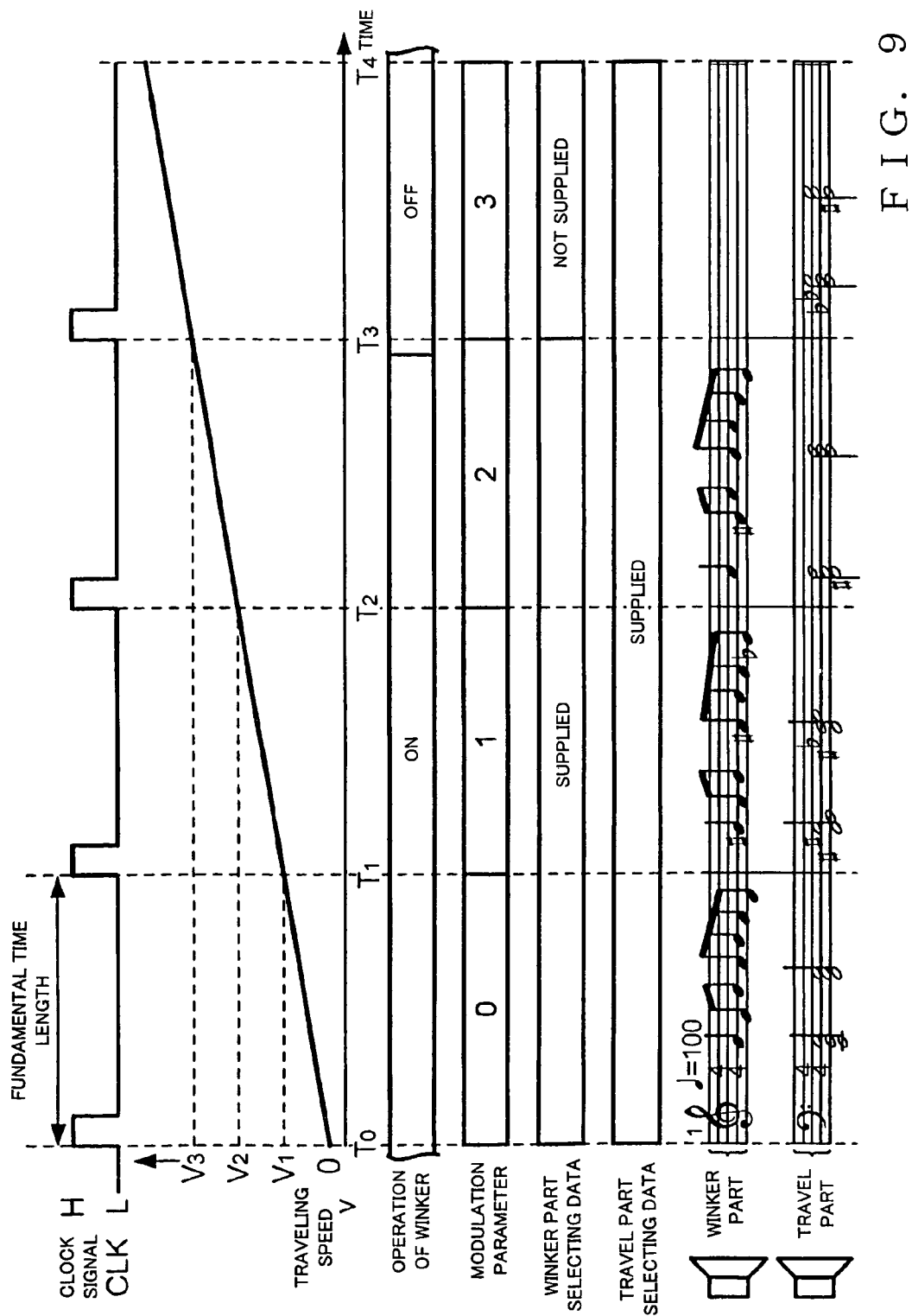
FIG. 9 is a diagram explanatory of behavior of the car audio system.

The timer clock 153 supplies the sequencer 154 with a clock signal CLK as illustrated in FIG. 9. The clock signal CLK is in the form of a pulse wave rising from a low (L) level to a high (H) level each time a predetermined fundamental time length elapses. Here, the fundamental time length is a time length necessary to perform an ensemble of one measure as illustrated in FIG. 2.

The sequencer 154 reads out the modulation parameter and ensemble data D1 from the FIFO memory 152 and, in accordance with the read-out modulation parameter, it performs a modulation process on the winker part data d11 and travel part data d12 included in the ensemble data D1.

Further, the sequencer 154 reads out the part selecting data from the FIFO memory 152 and, in accordance with the read-out part selecting data, it interprets the winker part data d11 having been subjected to the modulation process. Then, the sequencer 154 supplies the tone generator circuit 155 with tone generator parameters corresponding to the interpreted winker part data d11. More specifically, only when winker part selecting data has been received as the part selecting data, the sequencer 154 starts interpreting the winker part data d11 in response to rise timing of the clock signal CLK and then supplies the corresponding tone generator parameters to the tone generator circuit 155 for setting therein. Similarly, only when travel part selecting data has been received as the part selecting data, the sequencer 154 interprets the travel part data d12 having been subjected to the modulation process and then supplies corresponding tone generator parameters to the tone generator circuit 155 for setting therein. When both the winker part selecting data and the travel part selecting data have been received, the sequencer 154 concurrently interprets respective event data in the winker part data d11 and travel part data d12 in a parallel fashion and supplies the corresponding tone generator parameters to the tone generator circuit 155 for setting therein. As the tone generator parameters, there are employed pitch data, note-on/off signals, etc.

The tone generator circuit 155, which is a tone generation circuit capable of simultaneously generating tone signals of a plurality of performance parts, generates, for each of the performance parts, a tone signal based on the tone generator parameters set by the sequencer 154. More specifically, after the tone generator parameters corresponding to the winker part data d11 and travel part data d12 have been set, the tone generator circuit 155 generates digital tone signals representative of tones designated by the respective tone generator parameters and supplies the thus-generated tone signals to the DAC 156. The DAC 156 converts the supplied digital tone signals into analog representation and supplies the resultant analog tone signals to the speaker 160, which in turn outputs or audibly reproduces tones, representative of the performance parts of the ensemble, in accordance with the analog tone signals supplied from the DAC 156.

<Behavior of the Car Audio System>

Now, behavior of the car audio system 100 is set forth. The CPU 110 of the car audio system 100 performs a modulation parameter setting process in accordance with the modulation parameter setting program P1, as well as a part selecting process in accordance with the part selecting program P2.

The modulation parameter setting process is a process for identifying a modulation parameter, instructing modulation of the winker and travel part, in accordance with a traveling speed of the vehicle 200 and then supplying the identified modulation parameter to the tone generator section 150. The part selecting process is a process for supplying the travel part selecting data to the tone generator section 150 when the vehicle 200 is traveling, and supplying the winker part selecting data to the tone generator section 150 when the winker is in operation.

The following paragraphs describe the modulation parameter setting process and part selecting process performed by the CPU 110.

Figure 7:
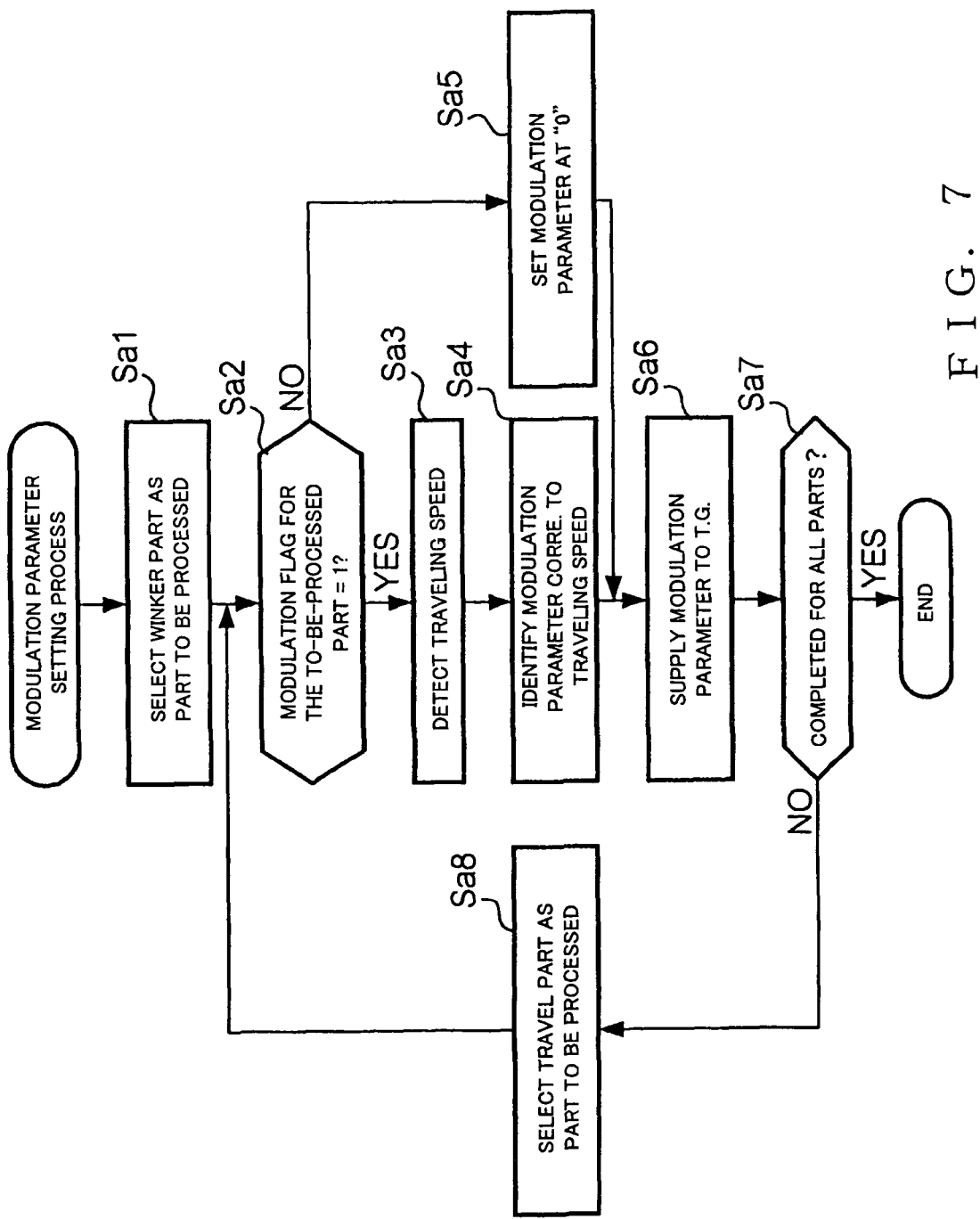
FIG. 7 is a flow chart of a modulation parameter setting process performed in the car audio system.

FIG. 7 is a flow chart of the modulation parameter setting process, which is started up in response to an ensemble output start instruction given via the start instruction switch and then carried out at predetermined time intervals in response to individual timer interrupt signals.

First, the CPU 110 selects, as a performance part to be processed (to-be-processed part), the winker part out of the two performance parts included in an ensemble, at step Sa1. Then, at step Sa2, the CPU 110 determines whether or not the modulation flag fg stored in the storage section 140 for the selected to-be-processed part is "1"; that is, a determination is made at this step as to whether the winker part is a performance part to be caused to module in accordance with a traveling speed of the vehicle 200.

With a negative (NO) determination at step Sa2, the CPU 110 sets the modulation parameter, indicative of a degree of modulation of the winker part, to "0" at step Sa5 and then proceeds to step Sa6 to be later described. The modulation parameter "0" indicates that the winker part should not be caused to modulate.

If, on the other hand, an affirmative (YES) determination has been made at step Sa2, the CPU 110 detects a traveling speed v of the vehicle by means of the detection section 130 at step Sa3, and then it sets a modulation parameter indicative of a degree of modulation of the to-be-processed part (in this case, "winker part"), in accordance with the detected traveling speed of the vehicle at step Sa4. More specifically, the CPU 110 sets, as the modulation parameter for the to-be-processed part, the modulation parameter that is defined, in the modulation parameter table TBL2 provided in the storage section 140 (see FIG. 5), in association with the traveling speed v detected at step Sa3. For example, if the detected traveling speed v is "$V_1 \leq v < V_2$", the CPU 110 refers to the modulation parameter table TBL2 and sets the modulation parameter "1" that is defined in association with the detected traveling speed v.

After that, the CPU 110 supplies the thus-set modulation parameter to the tone generator section 150, at step Sa6. At next step Sa7, the CPU 110 ascertains whether or not modulation parameters have been supplied to the tone generator section 150 for all of the performance parts (i.e., winker and travel parts) included in the ensemble.

With a negative answer at step Sa7, the CPU 110 then sets the travel part as the to-be-processed part at step Sa8 and performs the above-described operations of steps Sa2 to Sa7. Then, once an affirmative answer is obtained at step Sa7, namely, once modulation parameters have been supplied to the tone generator section 150 for all of the parts, the CPU 110 brings the modulation parameter setting process to an end.

Namely, the modulation parameter setting process is arranged in such a manner that, for each of the winker and travel parts, a modulation parameter corresponding to the detected traveling speed v is set if the corresponding modulation flag fg is "1" and then the thus-set modulation parameter is supplied to the tone generator section 150.

Next, the part selecting process performed by the CPU 110 is explained with reference to FIG. 8, which is also started up in response to an ensemble output start instruction given via the start instruction switch and then carried out at predetermined time intervals in response to timer interrupt signals.

First, the CPU 110 sets the winker part as a performance part to be processed, at step Sb1. Then, at step Sb2, the CPU 110 refers to the part table TBL1 of FIG. 4 and identifies an output condition defined in association with the to-be-processed part. In this case, the output condition "activation of the winker" is identified from the part table TBL1, because, in this case, the winker part has been set as the to-be-processed part.

Then, at step Sb3, the CPU 110 determines whether or not the current state of the vehicle 200 satisfies the identified output condition. Namely, because the current output condition is "activation of the winker", the CPU 110 determines whether the winker is currently in operation, on the basis of detection by the detection section 130. If, on the other hand, the identified output condition is "traveling of the travel part", then the CPU 110 determines whether the vehicle 200 is now traveling, on the basis of a traveling speed v detected by the detection section 130. Namely, the CPU 110 determines that the vehicle 200 is traveling, if the detected traveling speed v is other than "0". If the detected traveling speed v is "0", on the other hand, the CPU 110 determines that the vehicle 200 is currently at rest, i.e. not traveling.

With a negative determination at step Sb3, the CPU 110 jumps to step Sb5, while, with an affirmative determination at step Sb3, the CPU 110 supplies the tone generator section 150 with part selecting data for instructing audible tone output of the selected to-be-processed part, at step Sb4. In this case, where the winker part is the to-be-processed part, the CPU 110 supplies winker part selecting data to the tone generator section 150. If, on the other hand, the travel part is the to-be-processed part, the CPU 110 supplies travel part selecting data to the tone generator section 150. Namely, only when the determination of step Sb3 indicates that the current state of the vehicle 200 meets the output condition, the part selecting data instructing audible tone output of the to-be-processed part is supplied exclusively to the tone generator section 150.

Then, at step Sb5, the CPU 110 ascertains whether or not the above-described operations of steps Sb2 to Sb5 have been completed for both of the winker and travel parts. With a negative answer at step Sb5, the CPU 110 sets the travel part as the to-be-processed part at step Sb6 and performs the above-described operations of steps Sb2 to Sb5 for the travel part. Then, once an affirmative answer is obtained at step Sb5, namely, once the part selecting data have been supplied to the tone generator section 150, in accordance with the output conditions, for all of the parts, the CPU 110 brings the part selecting process to an end.

Namely, in the part selecting process, the winker part selecting data is supplied to the tone generator section 150 only when the winker is currently in operation, while the travel part selecting data is supplied to the tone generator section 150 only when the vehicle 200 is currently traveling.

In parallel with the above-described modulation parameter setting process and part selecting process, the CPU 110 reads out, from the storage section 140, ensemble data D1 including winker part data d11 and travel part data d12, and supplies the thus read-out ensemble data D1 to the tone generator section 150.

In this manner, the tone generator section 150 causes an ensemble, corresponding to a state of the vehicle 200, to be sounded or audibly reproduced via the speaker 160. Let's now assume a case where the traveling speed and operating condition of the winker vary in a manner as illustrated in FIG. 9, more specifically a case where the traveling speed v is "$0 \leq v < V_1$" and the winker is "ON" at a time point "$T_0$"; the traveling speed v is "$V_1$" and the winker is "ON" at a time point "$T_1$"; the traveling speed v is "$V_2$" and the winker is "ON" at a time point "$T_2$"; and the traveling speed v is "$V_3$" and the winker is "OFF" at a time point "$T_3$". Also note that these time points "$T_0$", "$T_1$", "$T_2$", "$T_3$" and "$T_4$" agree with successive rise timing of the clock signal CLK. Let's also assume that the modulation flags of the winker and travel parts are each set at "1".

During that time, predetermined modulation parameters are successively supplied, through the above-described modulation parameter setting process, to the tone generator section 150 as illustrated in FIG. 9. Namely, for each of the winker and travel parts, the modulation parameter "0" is supplied for a time period from the time point "$T_0$" to the time point "$T_1$", the modulation parameter "1" is supplied for a time period from the time point "$T_1$" to the time point "$T_2$", the modulation parameter "2" is supplied for a time period from the time point "$T_2$" to the time point "$T_3$", and the modulation parameter "3" is supplied for a time period from the time point "$T_3$" to the time point "$T_4$".

Further, the winker part selecting data and travel part selecting data are successively supplied, through the above-described part selecting process, to the tone generator section 150 as illustrated in FIG. 9. Namely, both the winker part selecting data and the travel part selecting data are supplied for a time period from the time point "$T_0$" to the time point "$T_3$", but only the travel part selecting data is supplied for a time period from the time point "$T_3$" to the time point "$T_4$".

In this way, for the time period from the time point "$T_0$" to the time point "$T_1$", the tone generator circuit 155 generates tone signals representative of the winker and travel parts, and causes the thus-generated tone signals to be audibly output via the speaker 160. Further, for the time period from the time point "$T_1$" to the time point "$T_2$", the tone generator circuit 155 causes tones of the winker and travel parts to be audibly output via the speaker 160 with a musical key raised by a half step. Further, for the time period from the time point "$T_2$" to the time point "$T_3$", the tone generator circuit 155 causes tones of the winker and travel parts to be audibly output via the speaker 160 with a musical key further raised by a half step. For the time period from the time point "$T_3$" to the time point "$T_4$" when only the travel part selecting data is supplied as the part selecting data, the tone generator circuit 155 causes tones of the travel part to be audibly output via the speaker 160 with a musical key further raised by a half step, but does not cause tones of the winker part to be audibly output.

Namely, the instant embodiment of the car audio system 100 is arranged to output tones of the winker part on condition that the winker is currently in operation and output tones of the travel part on condition that the vehicle is currently traveling. The winker part and travel part together constitute a single ensemble and have the same beat. Therefore, in the case where arrangements are made such that both the winker part and the travel part are audibly output concurrently in a parallel fashion, tones of the winker and travel parts are audibly output in a synchronized manner. Thus, with the described embodiment, each passenger in the vehicle can enjoy playing of an ensemble composed of a plurality of performance parts. As a result, the instant embodiment of the car audio system 100 can avoid giving an uncomfortable feeling to the passengers including the vehicle driver, in contrast to the conventional audio apparatus where tones indicative of various states of the vehicle are output separately or independently between the states.

Further, the described embodiment of the car audio system 100 can audibly output tones of the winker part and travel part in accordance with content of driving-related operation, by the vehicle driver, of the vehicle 200 and behavior of the vehicle 200 as if the vehicle driver himself or herself were actually playing a tune. Therefore, in contrast to the conventional audio apparatus arranged to output monotonous tones in accordance with states of the vehicle, the described embodiment of the car audio system 100 can provide the vehicle passengers with a new form of audio amusement which will never bore the passengers. Further, in the car audio system 100, the ensemble composed of the winker and travel parts is caused to module in accordance with the detected traveling speed v, so that the vehicle passengers can perceive, from the musical key of the ensemble, an approximate speed at which the vehicle 200 is currently traveling.

<Modification>

It should be appreciated that the present invention may be modified variously, without being limited to the above-discussed embodiment, as set forth below by way of example.

Whereas each ensemble data set D1 has been described above as including two separate sets of performance part data, i.e. winker part data d11 and travel part data d12, the ensemble data set D1 may be composed of a single set of performance part data as long as the single set of performance part data is constructed to represent a plurality of different performance parts. For example, a single set of MIDI music piece data, having a plurality of performance parts, can be used as an ensemble data set D1. In such a modification, the single ensemble data set D1, which has a data organization similar to that shown in FIG. 3, includes a mixture of information defining a winker part and information defining a travel part. Namely, each of a plurality of event data in the single ensemble data set D1 is representative of an event in the winker part or travel part, and these event data are managed timewise by corresponding delta times, so as to express the plurality of performance parts constituting the ensemble. Therefore, as the ensemble data D1 are supplied to the tone generator section 150, corresponding tones are audibly generated or output from the tone generator section 150 to provide an ensemble with the performance parts synchronized with each other, in the same manner as in the above-described embodiment. Namely, this modification can audibly output tones of the individual parts in a synchronized manner, without requiring the clock signal CLK of FIG. 9 that rises each time the predetermined fundamental time length elapses.

In this case, the status of each of the event data includes data indicative of the performance part (travel or winker part), and the sequencer 154 determines, on the basis of part selecting data supplied by the CPU 110, whether or not tone generator parameters obtained by interpreting the event data should be supplied to the tone generator circuit 155. Namely, when the output condition of "activation of the winker" is not met in the part selecting process of FIG. 8, a negative or "NO" determination is made at step Sb3 so that winker part selecting data is not supplied to the tone generator section 150, and thus the sequencer 154 selectively interprets only the event data of the travel part, ignoring the event data of the winker part of the ensemble data set D1. As a consequence, the sequencer 154 supplies tone generator parameters, corresponding to the event data of the travel part, to the tone generator circuit 155 for setting therein. In this way, even where the ensemble data set D1 comprises a single set of data having a plurality of performance parts, it is possible to achieve behavior similar to that of the above-discussed embodiment.

Figure 10:
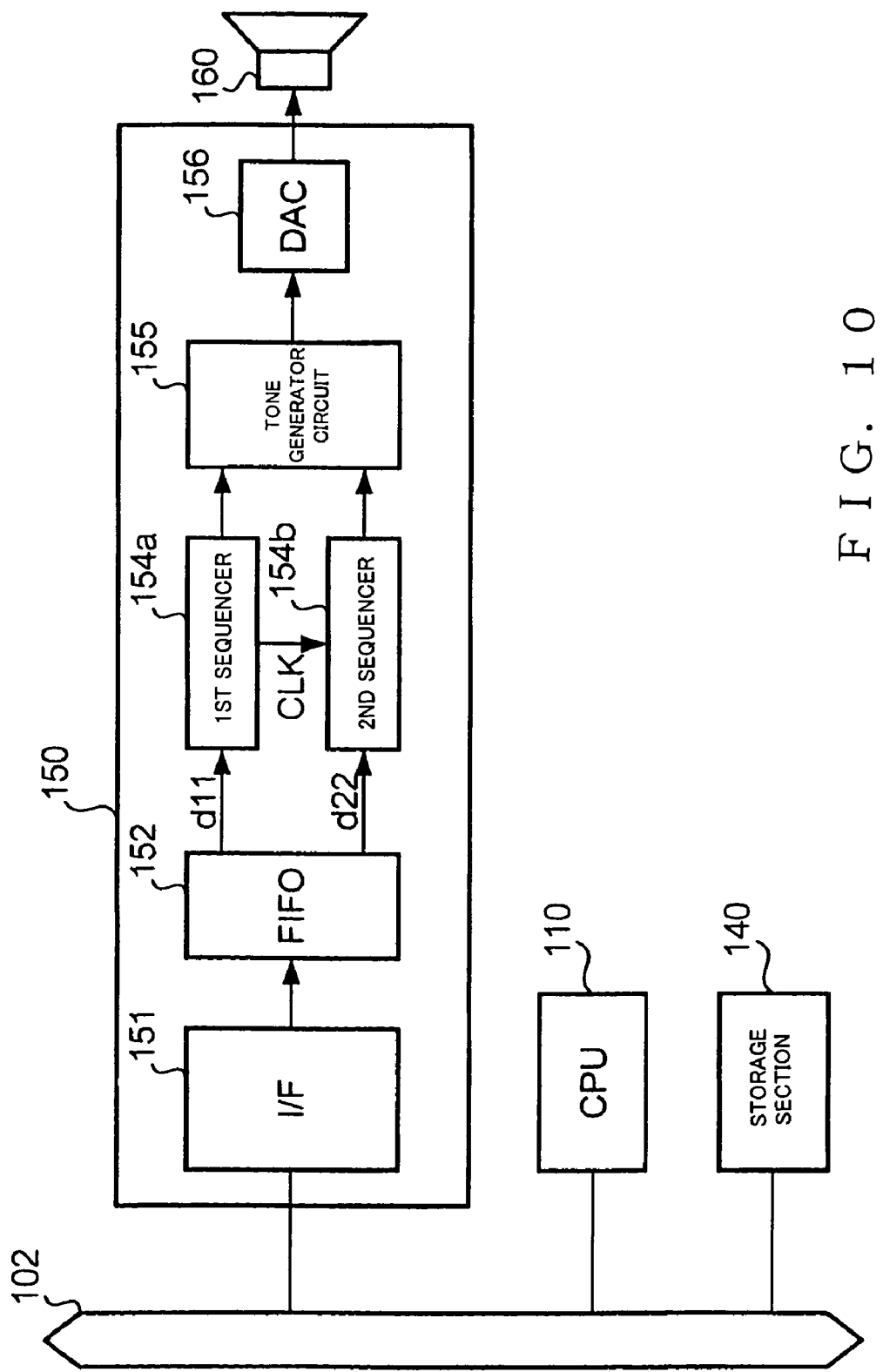
FIG. 10 is a block diagram showing a modification of the tone generator section and components peripheral to the tone generator section.

Whereas the tone generator section 150 has been described as processing the winker part data d11 and travel data d12 by means of the single sequencer 154, the winker part data d11 and travel data d12 may be processed independently of each other by means of separate sequencers, as set forth below. FIG. 10 is a block diagram showing a modification of the tone generator section 150, which is arranged to process the winker part data d11 and travel data d12 independently of each other by means of two separate sequencers 154a and 154b. In the illustrated example of FIG. 10, the FIFO memory 152 supplies the winker part data d11 and travel data d12 to the first and second sequencers 154a and 154b, respectively. Further, the FIFO memory 152 supplies winker part selecting data and winker part non-selecting data to the first sequencer 154a and supplies travel part selecting data and travel part non-selecting data to the second sequencer 154b.

The first sequencer 154a generates the above-mentioned clock signal CLK and supplies the generated clock signal CLK to the second sequencer 154b. Further, only when the first sequencer 154a has received the winker part selecting data from the FIFO memory 152, it interprets the received winker part data d11 in response to the rise timing of the generated clock signal CLK and supplies tone generator parameters, corresponding to the interpreted winker part data d11, to the tone generator circuit 155 for setting therein.

On the other hand, only when the second sequencer 154b has received the travel part selecting data from the FIFO memory 152, it interprets the received travel part data d12 in response to the rise timing of the generated clock signal CLK and supplies tone generator parameters, corresponding to the interpreted travel part data d12, to the tone generator circuit 155 for setting therein. In this modification too, the winker and travel part data d11 and d12 can be audibly output via the speaker 160 in a synchronized manner, as in the above-discussed embodiment.

It should be understood that the winker and travel part data d11 and d12 may be audibly output via the speaker 160 in a synchronized manner by separate tone generator sections 150 processing the part data d11 and d12 in a parallel fashion.

Whereas the above-discussed embodiment is arranged to audibly output the winker part on condition that the winker is currently in operation and audibly output the travel part on condition that the vehicle is currently traveling, the output conditions for audibly outputting the performance parts of the ensemble are not limited to the above-described. For example, any desired one of the performance parts may be audibly output in response to an instruction input via an operator member other than the winker lever, such as a brake pedal or shift lever, or in response to a variation in the state of the vehicle 200, such as the number of rotations of the engine or motor, acceleration of the vehicle 200 or the like. In short, the present invention may be constructed in any desired manner as long as it can detect a variation in the state of the vehicle and audibly output a desired performance part in accordance with the detected result.

In this disclosure, the "state of the vehicle" refers not only to operating conditions of the vehicle, such as the traveling speed, number of rotations of the engine and motor and ON/OFF of an ignition switch, but also to other conditions time-serially variable in the vehicle, such as a seating of a passenger, opening/closing of a vehicle door, remaining fuel amount and temperature within the vehicle compartment. The "state of the vehicle" also includes operation related to control of the vehicle. In the case of the vehicle 200, this control-related operation refers not only to operation directly related to driving of the vehicle, such as depression of the accelerator pedal and brake pedal, but also to operation that is not directly related to driving of the vehicle but may become necessary in association with the vehicle driving.

For example, where a desired performance part is to be audibly output in response to seating of a passenger, there may be provided a sensor for detecting whether a passenger has been seated on the seat so that the desired performance part can be audibly output in response to the detection by the sensor. Further, where a desired performance part is to be audibly output in response to opening/closing of a door of the vehicle, there may be provided a sensor for detecting opening/closing of the door so that the desired performance part can be audibly output in response to the detection by the sensor. According to another perspective than the above-described, there may be audibly output a desired performance part for a while after a passenger has got out of the vehicle. For that purpose, there may be provided a sensor for detecting presence/absence of a passenger in the vehicle so that the desired performance part can be audibly output for a predetermined time after the detection has changed from a "passenger present" state to "no passenger" state.

Where the vehicle 200 is an electric vehicle, arrangements may be made to vary a characteristic of a desired performance part in accordance with the number of rotations of the motor, in which case the following benefits can be achieved. Generally, in the case of the electric vehicle, the engine sound is smaller in level than that of the vehicle having a petrol engine, so that the vehicle driver can hardly perceive a variation in the number of rotations of the motor on the basis of the engine sound. However, with the modification where the characteristic of a desired performance part of an ensemble is varied in accordance with the number of rotations of the motor, the human vehicle driver is allowed to readily perceive, from the audibly output tones, a variation in the number of rotations of the motor responsive to depression of the accelerator pedal.

Further, the present invention may be arranged to audibly output the travel part while the electric vehicle is traveling and also audibly output, during rotation of the motor, another performance part (hereinafter "number-of-rotation part"). In this modification, the travel part and number-of-rotation part are audibly output in synchronism with each other while the electric vehicle is traveling, and, when the vehicle has been caused to stop traveling and placed in an idling state, the audible output of only the number-of-rotation part is continued. Therefore, in contrast to the petrol engine vehicles, the electric vehicle employing the modification of the present invention can be shifted from the traveling state to the idling state without disturbing the rhythm of the output tones.

Furthermore, whereas the described embodiment is arranged to output two performance parts, constituting an ensemble, in response to a variation in the state of the vehicle, one or more than two performance parts, rather than just two, may be audibly output in response to a variation in the state of the vehicle. In the case where only one performance part is audibly output, an uncomfortable feeling attributable to the performance part can be eliminated by employing the following arrangements. Namely, the uncomfortable feeling can be eliminated by synchronizing the beat of the performance part, to be audibly output in response to a variation in the state of the vehicle, to the beat of a music piece, such as BGM (Back-Ground Music), output independently of the state of the vehicle. With this modification, the beat of tones, such as those of the winker part, audibly output in response to a variation in the state of the vehicle can be effectively prevented from imparting an uncomfortable feeling to the passengers because the output tones are synchronized in beat to the BGM playing within the vehicle compartment. In this case, generation of the BGM is instructed, for example, through manual selection operation (BGM start operation) by the user (human vehicle driver).

Further, whereas, in the above-discussed embodiment, correspondency between the traveling speeds v and the modulation parameters is pre-defined in the parameter table TBL2, such correspondency may be set by the user for each performance part. With this modification, the user can cause the plurality of performance parts to modulate so as to be of the same musical key or parallel keys; namely, each of the performance parts can be caused to modulate as desired by the user.

Furthermore, whereas the above-discussed embodiment is arranged to perform modulation of the winker part and travel part in accordance with a state (in the illustrated embodiment, "traveling speed v") of the vehicle 200, the characteristic of the performance parts to be varied in accordance with a state of the vehicle 200 is not limited to the modulation. For example, the tone volume of the performance part to be audibly output from the speaker 160 may be increased as the traveling speed v increases, or the tempo of the performance part may be increased as the traveling speed v increases. Although, from the perspective of listening to an ensemble, it may be desirable to raise the tempos of the winker and travel parts after having made the tempos match with each other, the present invention may be arranged as appropriate to audibly output the winker part and travel part in such a manner that the output timing of tones in the winker part and the output timing of tones in the travel part are caused to coincide with each other (i.e., the winker and travel part coincide with each other in rhythm) on a periodical basis.

The above-discussed embodiment has assumed the automotive vehicle 200 as an example of the vehicle on which is mounted or installed the audio system for audibly outputting performance parts of an ensemble in response to a variation in a state of the vehicle. However, the vehicle on which the above-described audio system 100 or modifications thereof is not limited to the automotive vehicle 200; even where the inventive audio system is installed on any other suitable vehicles, such as electric trains, airplanes and ships, so as to audibly output the performance parts of the ensemble in response to user's operation and state of the vehicle, the same benefits as in the above-discussed embodiment can be accomplished effectively. Further, the present invention is not limited to the application where predetermined ensemble data are used; what is essential is that the present invention be arranged to allow a plurality of types of tones to be simultaneously output in an appropriately harmonized manner.

What is claimed is:

1. A vehicular audio apparatus comprising:
a detection device that detects a state of a vehicle;
a storage section storing ensemble data representative of an ensemble, the ensemble data including at least first part data indicative of a first performance part of the ensemble and a second part data indicative of a second performance part of the ensemble, a first output condition indicative of a first operating condition of the vehicle being associated with the first performance part while a second output condition indicative of a second operating condition of the vehicle is associated with the second performance part; and a tone generation device that generates a tone of the first performance part on the basis of the first part data when the state detected by said detection device meets the first output condition, but generates a tone of the second performance part on the basis of the second part data when the state detected by said detection device meets the second output condition, wherein, when the state detected by said detection device meets both the first output condition and the second output condition, said tone generation device generates the tones of the first performance part and the second performance part in parallel with each other to inform a vehicle operator as to the state of the vehicle based on the performance parts generated in parallel with each other, wherein said tone generation device includes a timer clock for outputting a timing signal, and, when the tones of the first performance part and the second performance part are to be generated in parallel with each other, said tone generation device generates the tones of the first performance part and the second performance part in a synchronized fashion at a same beat in response to a change of the timing signal, wherein the ensemble data includes a series of event data instructing controlling of tone generation of the first and second performance part, wherein said vehicular audio apparatus further comprises a storage device that stores a table defining correspondency between possible traveling speeds of the vehicle and modulation parameters, wherein the detection device detects a traveling speed of the vehicle as a state of the vehicle, and wherein the tone generation device generates a tone based on the ensemble data stored in said storage section, with reference to the table stored in said storage device, with a musical key designated by the modulation parameter corresponding to the traveling speed of the vehicle detected by said detection device.

2. A vehicular audio apparatus as claimed in claim 1, wherein said detection device further detects a state of the vehicle other than the traveling speed, and wherein said vehicular audio apparatus further comprises a control device that varies a characteristic of the tone of said first performance part or said second performance part, to be generated by said tone generation device, in accordance with the state of the vehicle detected by said detection device.

3. A vehicular audio apparatus as claimed in claim 2 wherein said control device varies the characteristic of the tone of one of said first performance part and said second performance part which is selected on the basis of an instruction by a user.

4. A vehicular audio apparatus as claimed in claim 1 wherein said first operating condition is a traveling state of the vehicle, and the tone of said first performance part is generated when the vehicle is in the traveling state.

5. A vehicular audio apparatus as claimed in claim 1 wherein said tone generation device generates the tone of said second performance part in accordance with an instruction by a human driver of the vehicle.

6. A vehicular audio apparatus as claimed in claim 1 wherein said detection device further detects respective variations in a plurality of states of the vehicle, and wherein said tone generation device is capable of simultaneously generating a plurality of types of tones of said second performance part, and said tone generation device generates one or more tones of said second performance part in synchronism with or in harmony with generation of the tone of said first performance part and in accordance with the types of states of the vehicle detected by said detection device.

7. A vehicular audio apparatus as claimed in claim 1 wherein said detection device further detects is a variation in an operating condition of an operator member provided on the vehicle for operation by the human driver.

8. A vehicular audio apparatus as claimed in claim 7 wherein said operator member is at least any one of a winker operating lever, ignition switch, accelerator pedal, brake pedal, shift lever and lamp switch.

9. A vehicular audio apparatus as claimed in claim 1 wherein said detection device further detects an operating condition of an engine or other equipment employed in the vehicle other than the traveling speed.

10. A vehicular audio apparatus as claimed in claim 1 wherein said detection device further detects a state of the vehicle other than the traveling speed, and said tone generation device performs an automatic performance sequence process based on the ensemble data and performs control, in accordance with an output of said detection device, as to whether or not tone generation of said second performance part should be executed.

11. A vehicular audio apparatus as claimed in claim 1 wherein said storage section stores the ensemble data for each of a plurality of ensemble music pieces, and wherein said tone generation device generates tones of said first performance part and said second performance part on the basis of the ensemble data for a ensemble music piece selected from among said plurality of ensemble music pieces.

12. A method for generating a vehicular audio tone by use of a storage device that stores ensemble data representative of an ensemble, the ensemble data including at least first part data indicative of a first performance part of the ensemble and second part data indicative of a second performance part of the ensemble, a first output condition indicative of a first operating condition of the vehicle being associated with the first performance part while a second output condition indicative of a second operating condition of the vehicle is associated with the second performance part, said method comprising:

a step of detecting a state of a vehicle; and a step of generating a tone of the first performance part on the basis of the first part data when the state detected by said step of detecting meets the first output condition, but generating a tone of the second performance part on the basis of the second part data when the state detected by said step of detecting meets the second output condition, wherein, when the state detected by said step of detecting meets both the first output condition and the second output condition, said step of generating generates the tones of the first performance part and the second performance part in parallel with each other to inform a vehicle operator as to the state of the vehicle based on the performance parts generated in parallel with each other, wherein, when the tones of the first performance part and the second performance part are to be generated in parallel with each other, said step of generating generates, on the basis of a timing signal outputted by a timer clock, the tones of the first performance part and the second performance part in a synchronized fashion at a same beat in response to a change of the timing signal, wherein the ensemble data includes a series of event data instructing controlling of tone generation of the first and second performance part, wherein said step of detecting detects a traveling speed of a vehicle as a state of the vehicle, and wherein said step of generating generates a tone based on the ensemble data stored in said storage, with reference to a table defining correspondency between possible traveling speeds of the vehicle and modulation parameters, with a musical key designated by the modulation parameter corresponding to the traveling speed of the vehicle detected by said step of detecting.

13. A non-transitory computer-readable storage medium storing a program for causing a computer to perform a method for generating a vehicular audio tone by use of a storage device that stores ensemble data representative of an ensemble, the ensemble data including at least first part data indicative of a first performance part of the ensemble and second part data indicative of a second performance part of the ensemble, a first output condition indicative of a first operating condition of the vehicle being associated with the first performance part while a second output condition indicative of a second operating condition of the vehicle is associated with the second performance part, said method comprising:

a step of detecting a state of a vehicle; and a step of generating a tone of the first performance part on the basis of the first part data when the state detected by said step of detecting meets the first output condition, but generating a tone of the second performance part on the basis of the second part data when the state detected by said step of detecting meets the second output condition, wherein, when the state detected by said step of detecting meets both the first output condition and the second output condition, said step of generating generates the tones of the first performance part and the second performance part in parallel with each other to inform a vehicle operator as to the state of the vehicle based on the performance parts generated in parallel with each other, wherein, when the tones of the first performance part and the second performance part are to be generated in parallel with each other, said step of generating generates, on the basis of a timing signal outputted by a timer clock, the tones of the first performance part and the second performance part in a synchronized fashion at a same beat in response to a change of the timing signal, and wherein the ensemble data includes a series of event data instructing controlling of tone generation of the first and second performance part, wherein said step of detecting detects a traveling speed of a vehicle as a state of the vehicle, and wherein said step of generating generates a tone based on the ensemble data stored in said storage, with reference to a table defining correspondency between possible traveling speeds of the vehicle and modulation parameters, with a musical key designated by the modulation parameter corresponding to the traveling speed of the vehicle detected by said step of detecting.

14. The method as claimed in claim 12, wherein said step of detecting further detects a state of the vehicle other than the traveling speed, and wherein said method further comprises a step of varying a characteristic of the tone of said first performance part or said second performance part, to be generated by said step of generating a tone of said first performance part, in accordance with the state of the vehicle detected by said step of detecting.

15. The computer-readable medium storing a program for causing a computer to perform a method as claimed in claim 13, wherein said step of detecting further detects a state of the vehicle other than the traveling speed, and wherein said method further comprises a step of varying a characteristic of the tone of said first performance part or said second performance part, to be generated by said step of generating a tone of said first performance part, in accordance with the state of the vehicle detected by said step of detecting.

* * * * *